US008950058B2

(12) United States Patent
Stiesdal

(10) Patent No.: US 8,950,058 B2
(45) Date of Patent: Feb. 10, 2015

(54) PRODUCING STACKED LAMINA ELEMENTS BY COMBINING A CUT OUT AND A STACKING PROCEDURE

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 562 days.

(21) Appl. No.: 12/706,996

(22) Filed: Feb. 17, 2010

(65) Prior Publication Data

US 2010/0229373 A1    Sep. 16, 2010

(30) Foreign Application Priority Data

Mar. 13, 2009   (EP) ..................................... 09003680

(51) Int. Cl.
    *H02K 15/00*    (2006.01)
    *H02K 15/02*    (2006.01)
    *B21D 28/22*    (2006.01)
    *B21D 43/22*    (2006.01)

(52) U.S. Cl.
    CPC .............. *H02K 15/024* (2013.01); *B21D 28/22* (2013.01); *B21D 43/22* (2013.01); *Y02E 10/725* (2013.01)
    USPC ................................ 29/596; 29/564.1; 29/732

(58) Field of Classification Search
    USPC ............ 29/596–598, 732–736; 310/216, 217
    See application file for complete search history.

(56) References Cited

U.S. PATENT DOCUMENTS

| | | | | |
|---|---|---|---|---|
| 4,578,853 A | * | 4/1986 | Wurth | 29/598 |
| 4,597,168 A | * | 7/1986 | Oboshi et al. | 29/596 |
| 5,265,320 A | * | 11/1993 | Greenway | 29/596 |
| 5,373,622 A | * | 12/1994 | Neuenschwander | 29/596 |
| 5,640,752 A | * | 6/1997 | Steiner | 29/596 |
| 5,755,023 A | * | 5/1998 | Neuenschwander | 29/596 |
| 6,163,949 A | * | 12/2000 | Neuenschwander | 29/521 |
| 6,672,502 B1 | * | 1/2004 | Paul et al. | 228/164 |
| 6,745,458 B2 | * | 6/2004 | Neuenschwander | 29/609 |
| 7,600,312 B2 | * | 10/2009 | Lee et al. | 29/738 |
| 2008/0047131 A1 | | 2/2008 | Neuenschwander et al. | |
| 2008/0229799 A1 | | 9/2008 | Musat et al. | |
| 2009/0025203 A1 | | 1/2009 | Tanaka et al. | |
| 2010/0229373 A1 | * | 9/2010 | Stiesdal | 29/596 |

FOREIGN PATENT DOCUMENTS

| | | |
|---|---|---|
| DE | 1 488 574 A1 | 10/1969 |
| DE | 35 29 050 C1 | 4/1986 |
| DE | 100 19 368 A1 | 10/2001 |
| EP | 1 410 857 A2 | 4/2004 |
| WO | WO 2008/065830 A1 | 6/2008 |

OTHER PUBLICATIONS

Gong Xiang et al.; "Manufacturing Techniques of Motor, Edition 1"; English Translation of pp. 70-127; Nov. 30, 1984.

* cited by examiner

Primary Examiner — Minh Trinh

(57) ABSTRACT

It is described a method for producing and stacking lamina elements in an aligned manner, in particular lamina elements for a stator of an electrical generator. The method cutting out a first lamina element from a foil, transferring the first lamina element to a container by utilizing the gravitational force, cutting out a second lamina element from the foil or from a further foil, and transferring the second lamina element to the container on top of the first lamina element by utilizing the gravitational force. It is further described a cutting machine for producing lamina elements, a container for stacking lamina elements in an aligned manner and a system for producing and stacking lamina elements in an aligned manner.

11 Claims, 2 Drawing Sheets

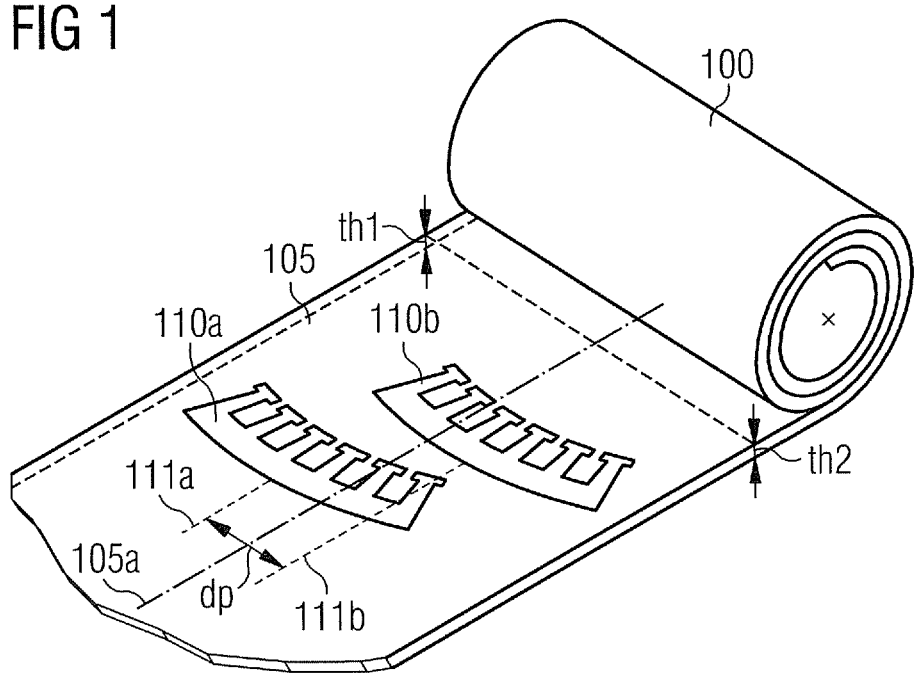
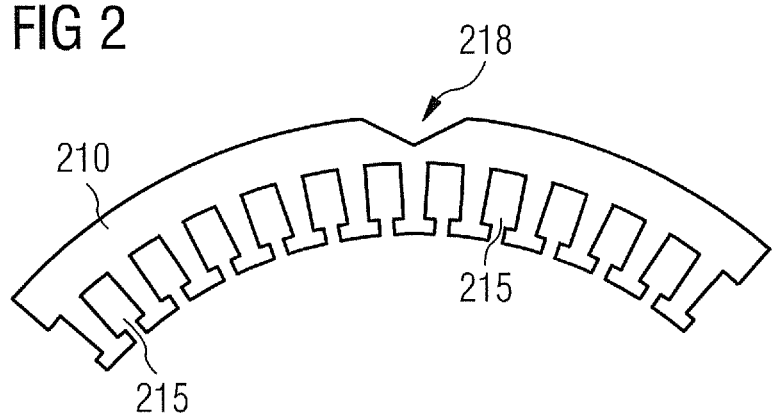

PRODUCING STACKED LAMINA ELEMENTS BY COMBINING A CUT OUT AND A STACKING PROCEDURE

CROSS REFERENCE TO RELATED APPLICATIONS

This application claims priority of European Patent Office application No. 09003680.7 EP filed Mar. 13, 2009, which is incorporated by reference herein in its entirety.

FIELD OF INVENTION

The present invention generally relates to the field of manufacturing an electrical generator. In particular the present invention relates to a manufacturing process of a stator device for an electrical generator, which can be used for instance in a wind turbine for generating electrical power from the available wing energy. Specifically, the present invention relates (a) to a method for producing and stacking lamina elements in an aligned manner, wherein a plurality of stacked lamina elements can be used as a magnetizable core of a stator in order to enhance the magnetic coupling between a rotor of the electrical generator and magnetic coils of the stator. Further, the present invention relates (b) to a cutting machine for producing lamina elements, (c) to a container for stacking lamina elements in an aligned manner and (d) to a system for producing and stacking lamina elements in an aligned manner.

ART BACKGROUND

A stator of an electric generator typically comprises a laminated structure being composed of a plurality of lamina elements. The lamina elements are usually punched out of a sheet of magnetizable metal such as for instance steel. The individual lamina elements are transported from a punching machine to a different location where they are stacked. This transportation procedure is typically carried out by means of a robot.

In order to achieve a proper alignment of a plurality of lamina elements, they have to be manually inserted into a specifically designed holding container, adjusted into the right position and finally fixed to each other by welding or bolting. This is a very long process that takes long calendar time and requires many man hours.

One possible solution for reducing the effort being necessary for producing the stators of large electrical machines is to improve the above mentioned process by implementing a conveyor belt. The conveyor belt receives punched lamina elements and transports the received lamina elements to a laminate building place. However, it is still necessary to insert the individual lamina elements into the container either by hand or by an appropriate robot.

US 2008/0047131 A1 discloses a method for manufacturing lamina stacks in a die assembly. Thereby, separate strips of stock material are guided through the die assembly along substantially separate feed paths being parallel to each other. From each of the strips lamina elements are blanked. Further, the blanked lamina elements from each of the strips are transferred into one common choke assembly which is adapted to receive the lamina elements from each of the strips in order to form lamina stacks. Although the disclosed method seems to be efficient there is still a lot of handling necessary in order to transfer the blanked lamina elements properly into the chock assembly.

There may be a need for further improving the manufacturing process for laminated structures such as for instance laminated stator segments for electric generator stators.

SUMMARY OF THE INVENTION

This need may be met by the subject matter according to the independent claims. Advantageous embodiments of the present invention are described by the dependent claims.

According to a first aspect of the invention there is provided a method for producing and stacking lamina elements in an aligned manner, in particular lamina elements for a stator of an electrical generator. The provided method comprises (a) cutting out a first lamina element from a foil, (b) transferring the first lamina element to a container by utilizing the gravitational force, (c) cutting out a second lamina element from the foil or from a further foil, and (d) transferring the second lamina element to the container on top of the first lamina element by utilizing the gravitational force.

This first aspect of the invention is based on the idea that the procedures of cutting out the lamina elements from the foil and the procedures of transferring the lamina elements to or into the container can be effectively combined and therefore carried out within one go. Thereby, the cut out lamina elements automatically fall to or fall into the container: The container may be a cradle and/or a canister.

Cutting out the second lamina element from a further foil means that the first lamina element is cut out from one foil and the second lamina element is cut out from another foil.

The described combined producing and stacking method may be repeated with a plurality of lamina elements, until a necessary height of the resulting lamina element stack has been obtained. Once the container has the right number of lamina elements it can be removed and replaced by another empty container and the described method can be restarted.

Generally speaking, according to the described method the process of cutting out the lamina elements and the process of stacking these lamina elements together are combined in such a way that the output of the combined process is a stack of lamina elements which is ready to be bonded together in order to form a stator segment for an electric generator. By combining the process of cutting out and the process of stacking into effectively one process the number of steps in the manufacturing process of laminated stator segments for an electric generator can be reduced. This may make the manufacturing process less complex and less costly.

The procedures of cutting out the first and/or the second lamina element can be accomplished for instance by means of a punching and/or a blanking procedure. A person skilled in the art will know how to realize an appropriate punching procedure, which of course may depend on the material and on the thickness of the foil.

The foil may be a metal foil, which is magnetizable and which is necessary in order to construct an effective electric generator. In particular the metal foil is made out of steel. In order to avoid eddy currents during an operation of a corresponding electric generator, the foil and as a consequence also the lamina elements may have at least one isolating layer on at least one side. This layer may be for instance an insulating varnish.

The width of the segment may correspond to the width of the foil and the cut out lamina elements always land in the same position on top of each other within the volume of the container. However, one could possibly want to cut out stator segments which are wider than a normal foil width of about 1250 mm. In this case it may be possible to cut out respectively only a portion of each lamina element, to combine two of such portions next to each other and to stack a plurality of combined lamina element portions over each other. Thereby, the stacking may be carried out in such a manner that the joint connection between two neighboring lamina element portions forming one lamina element is laterally displaced between two adjacent lamina elements each being comprised of at least two lamina element portions.

At this point it is mentioned that the manufactures of the metal foil typically provide the foil with an insulating varnish. However, if this is not the case the described method may comprise a further step, wherein an insulating material such as an insulating layer is put on top of the first lamina element before cutting out and transferring the second lamina element onto the first lamina element. Thereby, between the stacked lamina elements the insulating material is inserted.

According to an embodiment of the invention the method further comprises fixing the second lamina element and the first lamina element together.

The described fixing can be accomplished by means of any fixing mechanism which allows for joining the lamina elements together into a whole piece. At present welding, screwing and/or bolting seem to be appropriate measures in order to finally end up with a stable stacked lamina element structure.

It has to be mentioned that before fixing the lamina elements together the plurality of lamina elements which lie on top of each other can be compressed. Thereby, a compact stack of lamina elements may be produced.

According to a further embodiment of the invention (a) the first lamina element is cut out from the foil at a first position within the foil and (b) the second lamina element is cut out from the foil at a second position within the foil. Thereby, with respect to a centerline of the foil the first position has a first distance and the second position has a second distance being different to the first distance.

The orientation of the centerline of the foil may be given by the direction of a rolling off respectively an uncoiling of the foil from a coil, on which the foil has been coiled up before for instance because of storage purposes. This means that the centerline of the foil is oriented perpendicular to the longitudinal axis of the coil.

The described cutting out of different lamina elements at different lateral positions with respect to the centerline may provide the advantage that a compact stacked lamina element structure can be obtained even if the thickness of the foil is non-uniform over the foil surface. Thereby, difference variations with respect to the foil thickness may be evened out.

In practice, it often occurs that the coiled foil, which might have a width of approximately 1250 mm, a thickness of approximately 0.5 mm and/or, when unrolled, a length of approximately 1 km, is slightly thicker in the middle. Such a thickness variation is typical for a not perfect production respectively rolling of the foil. When performing a staggered cutting out such a non-uniform thickness contribution can be evened out at least partially.

Generally speaking, by accomplishing the cutting out of the lamina elements not always at the same spot of the foil but sometimes more to the left and sometimes more to the right with respect to the centerline of the foil, after a stack of a plurality of lamina elements of different thicknesses has been stacked, the whole stacked lamina element structure will be predominately straight and the differences of the foil thickness will be evened out.

According to a further embodiment of the invention the method further comprises turning upside down the cut out first lamina element or the cut out second lamina element.

Turning upside down some of the lamina elements may contribute to even out thickness variances. Thereby, in order to end up with a compact and straight stacked lamina element structure preferably about 50% of all lamina elements, which are involved in the described process, are turned upside down.

The turning of the lamina element(s) may be accomplished by means of any handling device. The handling device may comprise for instance a robot arm for actively turning the respective lamina element upside down. Further, the handling device may comprise an arrangement of at least two slides, on which the respective lamina element slips downwards because of the gravitational force. Thereby, the upside down turn may be accomplished after the respective lamina element has left the first slide and before it has reached the second slide.

Preferably, the handling device is intervening in the described combined cutting out and stacking process, when the just now cut out lamina element(s) is (are) falling down to or into the container.

According to a further embodiment of the invention the container comprises an inner shape, which is at least partially complementary to the outer shape of the first lamina element and to the second lamina element. This may provide the advantage that the lamina elements, once having been transferred to or into the container, are automatically stacked over each other in an aligned manner.

The container may be equipped with a guide mechanism such as at least one rail, which is characteristic for the described inner shape of the container. In order to guarantee for a perfect alignment of the lamina elements the lamina elements may have appropriate recesses, which are shaped complementary with respect to the guide mechanism. Of course, it is also possible that the guide mechanism comprises at least one notch, which is adapted to receive a complementary formed protrusion of the first lamina element and/or the second lamina element.

According to a further embodiment of the invention the container is formed and/or is oriented in such a manner, that the surface of the first lamina element and the second lamina element, when being received within the container, is slanted with respect to the direction of the gravitational force. This may provide the advantage that if the second lamina element will not land at the first lamina element in a perfectly aligned manner, the second lamina element will slide on the first lamina element into its proper position, which is defined by at least a portion of the inner shape of the container. Thereby, this portion acts as a stop device for the sliding movement of the second lamina element on top of the first lamina element.

According to a further embodiment of the invention the first lamina element is placed in the container in one position relative to a centerline of the container and the second lamina element is placed in the container in a second position relative to a centerline of the container. Thereby, the second position is different to the first position and the second lamina element does not or only partially come to rest on the first lamina element solely by utilizing the gravitational force.

Generally speaking, it may not be necessary that the first and the second lamina elements are automatically aligned with respect to each other immediately after the second lamina element has fallen onto the first lamina element. A perfect alignment may also be achieved by an appropriate lateral movement of the second lamina element being located on top of the first lamina element. Such a movement may be caused for instance by any appropriated handling device acting on at least one of the two lamina elements.

According to a further embodiment of the invention the method further comprises shaking the container. By shaking the container a sliding movement, which might be necessary in order to reach a perfectly aligned relative position between the two lamina elements, can be initiated in a reliable manner and, as a consequence, a non aligned stacking can be avoided effectively. Thereby, the production reliability for stator segments can be improved.

According to a further embodiment of the invention the method further comprises moving the container downward. This movement is carried out after the first lamina element has been received by the container and before the second lamina element will be received by the container. This may provide the advantage that the process reliability can be enhanced because it can be avoided that a lamina element could end up oriented in the wrong direction after falling a substantial distance between the place of cutting and the container.

The downward movement of the container could be accomplished gradually or stepwise. The movement could be controlled by a vertical relocate mechanism such as for instance a motor. The downward movement could also comprise a spring mechanism wherein, when the weight of the container changes, a spring element automatically adapts the vertical position of the container such that the fall distance for the lamina elements does not exceed a predetermined threshold. Thereby, an unwanted rotation of the lamina element during its fall down can be avoided. Depending on the specific construction of the spring mechanism the spring element can be compressed or expanded due to the increasing weight of the container when being successively filled with lamina elements.

According to a further embodiment of the invention (a) the cutting out of the first lamina element is carried out by means of a first machine and (b) the cutting out of the second lamina element is carried out by means of a second machine. This may provide the advantage that the speed, with which the described method can be carried out, can be increased significantly. Hence, the efficiency for producing stator segments can be further increased.

Generally speaking, two or even more machines may be used for feeding the same container. This feeding can be done in a regular sequence or in a specific pattern for instance on order to build larger and/or more uniform stator segments.

According to a further embodiment of the invention the method further comprises transferring a modified lamina element onto the first lamina element, wherein the modified lamina element comprises at least one duct. This means that the modified lamina element is interposed between the first and the second lamina element. Thereby, of course the second lamina element is no more transferred directly onto the first lamina element. It is rather transferred indirectly onto the first lamina element and directly onto the modified lamina element.

The provision of at least one duct may provide the advantage that during operation the stator segment may be cooled. Depending on the thermodynamic requirements and in particular depending on the size of the cross sectional area or the diameter of the duct the cooling may be an air cooling and/or a liquid cooling such as for instance a water cooling.

According to a further aspect of the invention there is provided a cutting machine for producing lamina elements, in particular lamina elements for a stator of an electrical generator. The provided cutting machine comprises a cutting mechanism for cutting out a first lamina element from a foil and for cutting out a second lamina element from the foil or from a further foil. Thereby, the cutting machine is adapted for releasing the cut out first lamina element and the cut out second lamina element, such that by utilizing the gravitational force the first lamina element and the second lamina element are transferred to a container, in which they are arranged in a stacked and in an aligned manner with respect to each other.

This further aspect of the invention is based on the idea that the processes of cutting out the lamina elements from the foil and the processes of transferring the respective lamina element to or into the container can be combined. Thereby, the cut out lamina elements automatically fall to or into the container. By contrast to known procedures, wherein the procedure of cutting out a lamina element and the procedure of transferring the cut out lamina element into a container are separated from each other, the described method allows for combining these procedures into effectively one process. This may allow for producing laminated stator segments for an electric generator more efficient and, as a consequence, less costly.

According to a further aspect of the invention there is provided a container for stacking lamina elements in an aligned manner, in particular lamina elements for a stator of an electrical generator. The container comprises a chassis, which is adapted for receiving a first and a second lamina element such that they are arranged in a stacked and in an aligned manner with respect to each other. Thereby, the first and the second lamina elements have been cut out from at least one foil by means of a cutting mechanism and the first and the second lamina elements have been transferred to the container by utilizing the gravitational force.

Also this further aspect of the invention is based on the idea that laminated stator segments for an electric generator can be manufactured more efficiently and less costly by combining the procedure of cutting out a lamina element and the procedure of transferring the cut out lamina element to or into a container into effectively one process. Thereby, the gravitational force automatically links the cutting out process and the receiving respectively the alignment process. After having carried out the first process the second process will be accomplished automatically requiring any further interaction.

It has to be mentioned that there are two different alternatives for realizing the described container. According to a first alternative the container is recycled in order to produce a plurality of laminated stator segments each comprising a plurality of lamina elements. This may mean that the container can be understood as just a tool, wherein a finished laminated stator segment is taken out of the container together with such parts of the structure that may have been added for instance by the above described welding and/or bolting process.

According to the second alternative the container is a single use container. This may mean that the container will become a part of the final stacked lamina element structure. Thereby, the container may become integral with this structure in order to form a complete segment of the stator of an electric generator. In this case the container is of course not recycled, and the respective cutting out machine is fed not with recycled containers but each time with a new container that will end up being part of the final electrical machine structure.

According to an embodiment of the invention the chassis comprises at least partially a cylindrical shape. This may provide the advantage that the described container can be used for the manufacturing of the most common stator segments, which have a substantially circular outer shape or the shape of a segment of a circle.

According to a further embodiment of the invention the container further comprises a guide mechanism, which is formed at the chassis and which comprises a contour being shaped complementarily with respect to the shape of the first and the second lamina elements.

The contour may be realized by means of a protrusion over the other inner surface of the chassis. The protrusion may match to a recess being formed at the first and the second lamina element.

It has to be mentioned that the cut out lamina elements may also have more than one recess. In this case and in order to avoid non-ambiguity of the alignment of the lamina elements the lamina elements should also have a corresponding number of recesses.

In other words, the container may have an elevated bar which matches exactly the recesses of the lamina elements. So cut out lamina elements dropped to or into the container always get aligned with respect to each other.

It is further mentioned that it is also possible that the guide mechanism comprises at least one notch, which is adapted to receive a complementary formed protrusion of the first lamina element and/or the second lamina element.

According to a further aspect of the invention there is provided a system for producing and stacking lamina elements in an aligned manner, in particular lamina elements for a stator of an electrical generator. The provided system comprises (a) a cutting machine as described above for producing lamina elements and (b) a container as described above for stacking lamina elements. The system is adapted for carrying out the method as set forth in any of the above described method-related embodiments.

This further aspect of the invention is based on the idea that the process of cutting out the lamina elements and the process of stacking these lamina elements together can be combined into effectively one single process only. Thereby, the gravitational force makes the second process automatically following the first process without requiring any further interaction for instance by a user.

The output of the combined process is a stack of lamina elements which is ready to be bonded together in order to form a stator segment for an electric generator. By combining the cutting out and the stacking into effectively one process the number of steps in the manufacturing process of laminated stator segments for an electric generator can be reduced. This may make the manufacturing process less complex and less costly.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1 shows a punched metal foil, wherein the cut-out for a first lamina element and the cut-out for a second lamina element are offset with respect to a centerline of the foil.

FIG. 2 shows a lamina element.

DETAILED DESCRIPTION

Figure 3:
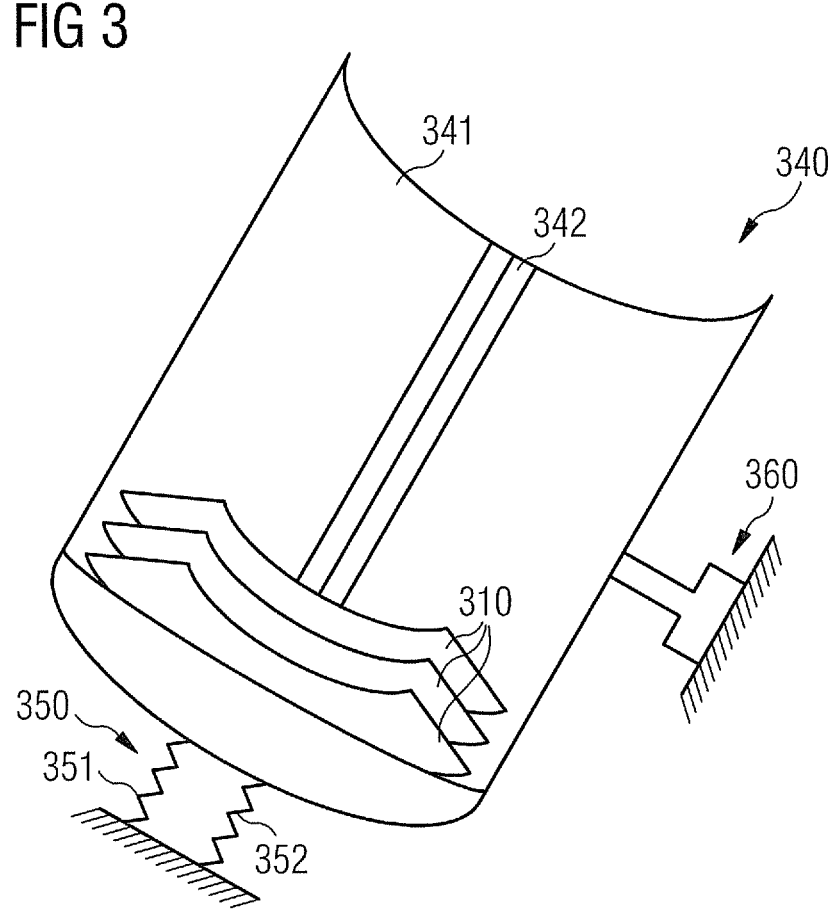
FIG. 3 shows a container for receiving cut out lamina elements in an aligned manner.

The illustration in the drawing is schematically. It is noted that in different figures, similar or identical elements are provided with reference signs, which are different from the corresponding reference signs only within the first digit.

FIG. 1 shows a punched metal foil 105. According to the embodiment described here the metal foil 105 is made out of steel and has a thickness of approximately 0.5 mm. The foil 105 is partially unrolled from a coil 100 along a longitudinal axis 105a. The longitudinal axis corresponds to a centerline 105a of the foil 105.

According to the embodiment described here the foil 105 comprises a thickness variance along an axis being perpendicular to the centerline 105a. A first thickness th1 and a second thickness th2 are indicated. The difference between the first thickness th1 and the second thickness th2 may be for instance 0.01 mm or 0.05 mm.

In order to even out thickness variances at least partially, a first cut-out 110a for a first lamina element and a second cut-out 110b for a second lamina element are offset with respect to the centerline 105a. Between the first cut-out position and the second cut-out position, which are indicated with the reference numerals 111a and 111b, respectively, there is a difference dp. By cutting out the lamina elements not always at the same spot of the roll but in an alternating manner one time more to the left and another time more to the right, a stack of a plurality of laminate elements having slightly thickness variations will be straight and the thickness differences will be evened out.

According to the embodiment described here the foil 105 has a length of about 1 km and a width of 1250 mm. However, it should be clear that also other dimensions are possible in order to realize the invention described in this document.

FIG. 2 shows in schematic form a lamina element 210. Together with other lamina elements of the same type the lamina element 210 can be used for instance for a laminated stator segment for the stator of an electric generator.

The lamina element 210, which has been punched out as a whole from the metal foil 105 shown in FIG. 1, comprises a plurality of slots 215 along its inner circumference. The slots 215 are used in a known manner for receiving wire wound coils of the stator windings. Along the outer circumference of the lamina element 210 there is provided at least one recess 218, which has also been formed by the mentioned punching procedure.

It is mentioned that the invention described in this document can also be carried out with lamina elements which, with respect to the lamina element 210 shown in FIG. 2, are different in shape and/or in size.

FIG. 3 shows a container 340 for punched stator lamina elements, which are now denominated with reference numeral 310. The container 340 comprises a chassis 341. According to the embodiment described here the chassis 341 is shaped as a segment of a canister which is open at the top and closed at the bottom. On the inside of the chassis 341 one or more bars 342 are provided. The at least one bar represents a guide mechanism 342. The size and shape of these bars 342 correspond to the size and shapes of the recess 218 (see FIG. 2) in a complementary manner.

When a lamina element 310 has been punched it is ejected from a not depicted punching machine and falls into the container 340. In FIG. 3 there are shown three lamina elements 310, which have been received by the container 340. For the sake of clarity the winding slots (compare FIG. 2, reference numeral 215) are not shown. As can be seen from FIG. 3, the container 340 respectively the chassis 341 of the container 340 is slightly tilted in such a way that the lamina elements 310 can be held in place within the container 340 just by gravity.

The container 340 can be optionally provided with a vibrating mechanism 360. This allows for a vibration of the container 340, which in combination with gravity will cause the recesses 218 in the outer circumference of the lamina elements 210, 310 to align with the bars 342 on the inside of the container 340. This in turn ensures that all the lamina elements 310 are stacked inside the container 340 in a correct alignment with respect to each other.

Further, the container 340 can be optionally provided with a spring mechanism 350, which allows the container 340 to gradually move downwards as it is getting sequentially filled with lamina elements 310. According to the embodiment described here the spring mechanism comprises two spring elements 351 and 352. By adapting the vertical position of the container 340 to the total weight of the received lamina elements, it can be avoided that the first lamina element will have to fall a substantial distance before coming to rest in the container 340. In such a case the respective lamina element 310 could end up oriented in the wrong direction after falling a substantial large distance.

When a predetermined number of lamina elements 310 has been collected and stacked in the container 340, the container 340 is removed to another location for further processing the stack of lamina elements 310 for instance by bolting, by screwing and/or by welding in order to form a laminated stator segment.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for producing and stacking lamina elements in an aligned manner, the lamina elements for a stator of an electrical generator, the method comprising:
cutting out a first lamina element from a foil at a first position within the foil;
transferring the first lamina element to a container by utilizing the gravitational force;
cutting out a second lamina element from the foil at a second position within the foil, wherein with respect to a centerline of the foil, the first position has a first distance and the second position has a second distance being different to the first distance; and
transferring the second lamina element to the container on top of the first lamina element by utilizing the gravitational force,
wherein
the container comprises an inner shape, which is at least partially complementary to an outer shape of the first lamina element and to the second lamina element,
wherein the method further comprises orienting the container such that a surface of the first lamina element and of the second lamina element, when being received within the container, is slanted with respect to the direction of the gravitational force.

2. The method as set forth in claim 1, further comprising: fixing the second lamina element and the first lamina element together.

3. The method as set forth in claim 1, further comprising: turning upside down the cutting out of the first lamina element or the second lamina element.

4. The method as set forth in claim 1, further comprising: shaking the container.

5. The method as set forth in claim 1, further comprising: moving the container downward after the first lamina element has been received by the container and before the second lamina element will be received by the container.

6. The method as set forth in claim 1, wherein
the cutting out of the first lamina element is carried out via a first machine, and
the cutting out of the second lamina element is carried out via a second machine.

7. The method as set forth in claim 1, further comprising: transferring a modified lamina element onto the first lamina element, wherein the modified lamina element comprises at least one duct.

8. The method as set forth in claim 1, wherein the first lamina element and the second lamina element are transferred to the container sequentially one after the other.

9. The method as set forth in claim 1, wherein the foil has a thickness variance along an axis that is perpendicular to the centerline of the foil.

10. A method for producing and stacking lamina elements in an aligned manner, the lamina elements for a stator of an electrical generator, the method comprising:
cutting out a first lamina element from a foil at a first position within the foil;
transferring the first lamina element to a container by utilizing the gravitational force;
cutting out a second lamina element from the foil at a second position within the foil, wherein with respect to a centerline of the foil, the first position has a first distance and the second position has a second distance being different to the first distance;
transferring the second lamina element to the container on top of the first lamina element by utilizing the gravitational force, and
orienting the container such that a surface of the first lamina element and of the second lamina element, when being received within the container, is slanted with respect to the direction of the gravitational force.

11. A method for producing and stacking lamina elements in an aligned manner, the lamina elements for a stator of an electrical generator, the method comprising:
cutting out a first lamina element from a foil at a first position within the foil;
transferring the first lamina element to a container by utilizing the gravitational force;
cutting out a second lamina element from the foil at a second position within the foil, wherein with respect to a centerline of the foil, the first position has a first distance and the second position has a second distance being different to the first distance;
transferring the second lamina element to the container on top of the first lamina element by utilizing the gravitational force,
placing the first lamina element in the container in a first position relative to a centerline of the container,
placing the second lamina element in the container in a second position relative to the centerline of the container,
wherein the second position is different to the first position and wherein the second lamina element does not or only partially come to rest on the first lamina element solely by utilizing the gravitational force.

\* \* \* \* \*